United States Patent
Wagle et al.

(10) Patent No.: US 11,313,204 B2
(45) Date of Patent: Apr. 26, 2022

(54) INSULATING FLUID FOR THERMAL INSULATION

(71) Applicant: Saudi Arabian Oil Company, Dhahran (SA)

(72) Inventors: Vikrant Bhavanishankar Wagle, Abqaiq (SA); Abdullah Saleh Hussain Al-Yami, Dhahran (SA); Abdullah Awadh, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 51 days.

(21) Appl. No.: 16/799,065

(22) Filed: Feb. 24, 2020

(65) Prior Publication Data
US 2020/0190946 A1 Jun. 18, 2020

Related U.S. Application Data

(63) Continuation of application No. 15/812,261, filed on Nov. 14, 2017, now Pat. No. 10,570,699.

(51) Int. Cl.
*E21B 36/00* (2006.01)
*B01J 13/00* (2006.01)
(Continued)

(52) U.S. Cl.
CPC ......... *E21B 36/003* (2013.01); *B01J 13/0065* (2013.01); *C09K 8/04* (2013.01); *E21B 33/14* (2013.01)

(58) Field of Classification Search
None
See application file for complete search history.

(56) References Cited

U.S. PATENT DOCUMENTS

| 4,231,882 A | 11/1980 | Elphingstone et al. |
| 5,320,171 A | 6/1994 | Laramay |

(Continued)

FOREIGN PATENT DOCUMENTS

| CN | 104530987 | 4/2015 |
| WO | WO2014085770 | 6/2014 |
| WO | WO2015041703 A1 | 3/2016 |

OTHER PUBLICATIONS

Chu et al., "Glycidoxypropyltrimethocysilane Modified Colloidal Silica Coatings," MRS Proceedings, vol. 435, Jan. 1, 1996, 5 pages.
(Continued)

*Primary Examiner* — Anuradha Ahuja
(74) *Attorney, Agent, or Firm* — Fish & Richardson P.C.

(57) ABSTRACT

An insulating fluid system includes an acidic nanosilica dispersion and an alkaline activator. The acidic nanosilica dispersion includes silica nanoparticles and a stabilizer, such as a carboxylic acid. The alkaline activator includes an alkanolamine, such as a monoalkanolamine. A mixture of the acidic nanosilica dispersion and the alkaline activator forms an insulating fluid having a pH greater than 7 and less than or equal to 12, and the insulating fluid forms an insulating gel when heated to a temperature in a range between 100° F. and 300° F. The insulating gel may be formed in an annulus between an inner conduit and an outer conduit. The inner and outer conduits may be positioned in a subterranean formation. Forming an insulating gel may include combining the acidic nanosilica dispersion with the alkaline activator to yield the insulating fluid, and heating the insulating fluid to form the insulating gel.

4 Claims, 3 Drawing Sheets

(51) Int. Cl.
*C09K 8/04* (2006.01)
*E21B 33/14* (2006.01)

(56) References Cited

U.S. PATENT DOCUMENTS

| | | | |
|---|---|---|---|
| 6,085,839 | A | 7/2000 | Wyant et al. |
| 7,013,973 | B2 | 3/2006 | Danican et al. |
| 7,458,424 | B2 | 12/2008 | Odeh et al. |
| 7,934,557 | B2 | 5/2011 | Nguyen |
| 7,954,549 | B2 | 6/2011 | Lende et al. |
| 9,045,965 | B2 | 6/2015 | Patil et al. |
| 9,133,386 | B2 | 9/2015 | Kumar et al. |
| 2006/0041028 | A1 | 2/2006 | Crews |
| 2008/0035343 | A1 | 2/2008 | Odeh et al. |
| 2011/0094746 | A1 | 4/2011 | Allison et al. |
| 2013/0292120 | A1* | 11/2013 | Patil ................. C09K 8/506 166/293 |
| 2014/0158354 | A1* | 6/2014 | Kumar ................ C09K 8/08 166/293 |
| 2015/0299558 | A1 | 10/2015 | Sui et al. |
| 2015/0322328 | A1* | 11/2015 | Boul ................. E21B 43/04 166/278 |
| 2016/0090525 | A1 | 3/2016 | McDonald et al. |
| 2016/0201433 | A1* | 7/2016 | Kalgaonkar ........... C04B 28/24 166/302 |

OTHER PUBLICATIONS

International Search Report and Written Opinion issued in International Application No. PCT/US2018/060124 dated Feb. 13, 2019, 16 pages.

GCC Examination Report issued in Gulf Cooperation Council Application No. GC 2018-36454 dated Oct. 5, 2020, 6 pages.

GCC Examination Report in Gulf Cooperation Council Appln. No. GC 2018-36454, dated May 29, 2021, 3 pages.

* cited by examiner

INSULATING FLUID FOR THERMAL INSULATION

CROSS-REFERENCE TO RELATED PATENT APPLICATIONS

This application is a continuation of and claims the benefit of priority to U.S. patent application Ser. No. 15/812,261, filed Nov. 14, 2017, the contents of which are incorporated by reference herein.

TECHNICAL FIELD

This disclosure relates to an aqueous insulating fluid with low thermal conductivity for pipeline and subterranean applications.

BACKGROUND

Insulating fluids are often used in subterranean operations to insulate a hydrocarbon-containing fluid from the surrounding environment. For instance, if the surrounding environment is cold, insulating fluid can be provided to an annulus between a first tubing through which a hydrocarbon-containing fluid flows and a second tubing or the walls of a well bore to reduce precipitation of heavier hydrocarbons, thereby promoting flow of the hydrocarbon-containing fluid through the first tubing. Insulating fluids are also used for other insulating applications in which control of heat transfer is needed. Typical insulating fluids are formed by combining an alkaline nanosilica dispersion with an acidic activator such as phytic acid, methyglycinediacetic acid, or polyepoxysuccinic acid and are acidic, thereby contributing to corrosion downhole.

SUMMARY

In a first general aspect, an insulating fluid system includes an acidic nanosilica dispersion and an alkaline activator. The acidic nanosilica dispersion includes silica nanoparticles and a stabilizer. The alkaline activator includes an alkanolamine. A mixture of the acidic nanosilica dispersion and the alkaline activator forms an insulating fluid having a pH greater than 7 and less than or equal to 12, and the insulating fluid forms an insulating gel when heated to a temperature in a range between 100 degrees Fahrenheit (° F.) and 300° F.

In a second general aspect, forming an insulating gel in an annulus between an inner conduit and an outer conduit includes combining an alkaline activator with an acidic nanosilica dispersion to yield an insulating fluid having a pH greater than 7 and less than or equal to 12, providing the insulating fluid to the annulus, and heating the insulating fluid in the annulus to a temperature in a range between 100° F. and 300° F., thereby forming an insulating gel in the annulus. The alkaline activator includes an alkanolamine, and the acidic nanosilica dispersion includes silica nanoparticles and a stabilizer.

In a third general aspect, forming an insulating gel in an annulus between an inner conduit and an outer conduit includes providing an acidic nanosilica dispersion to the annulus, combining an alkaline activator with the nanosilica dispersion in the annulus to yield an insulating fluid having a pH greater than 7 and less than or equal to 12, and heating the insulating fluid in the annulus to a temperature in a range between 100° F. and 300° F., thereby forming an insulating gel in the annulus. The acidic nanosilica dispersion includes silica nanoparticles and a stabilizer, and the alkaline activator includes an alkanolamine.

In a fourth general aspect, forming an insulating gel includes combining an acidic nanosilica dispersion with an alkaline activator to yield an insulating fluid having a pH greater than 7 and less than or equal to 12, and heating the insulating fluid to a temperature in a range between 100° F. and 300° F., thereby forming an insulating gel. The alkaline activator includes an alkanolamine, the acidic nanosilica dispersion includes silica nanoparticles and a stabilizer, and the stabilizer and the alkanolamine react to yield a carboxamide.

Implementations of the first, second, third, and fourth general aspects may independently include one or more of the following features.

In some embodiments, the stabilizer includes a carboxylic acid. In some examples, the carboxylic acid includes at least one of acetic acid, lactic acid, and citric acid. In some embodiments, the alkanolamine includes at least one of monoethanolamine, diethanolamine, and triethanolamine.

A pH of the acidic nanosilica dispersion is typically in a range between 2 and 4. A particle size of the silica nanoparticles is typically in a range between 5 nanometers (nm) and 100 nm. The nanosilica dispersion may include 5 weight percent (wt %) to 50 wt % of the silica nanoparticles. A viscosity of the nanosilica dispersion at room temperature is in a range between 5 centipoise (cP) and 200 cP.

The insulating fluid may include 0.1 volume percent (vol %) to 20 vol % or 0.5 vol % to 20 vol % of the alkaline activator. The insulating fluid typically forms an insulating gel in 2 hours (h) to 24 h when heated to a temperature in a range between 100° F. and 300° F.

Implementations of the second and third general aspects may independently include one or more of the following features.

In some embodiments, the inner conduit and the outer conduit are positioned in a subterranean formation. The outer conduit may be a wellbore. The second general aspect may further include flowing a fluid through the inner conduit. In one example, the fluid is a hydrocarbon-containing fluid.

Advantages of the compositions and methods described in this disclosure include ease of pumping due at least in part to the low viscosity of the packer fluid composition, elimination of corrosion due at least in part to the alkaline nature of the final gelled packer fluid, controllable gel times, availability and cost effectiveness of materials, and ease of operational implementation.

DETAILED DESCRIPTION

Figure 1:
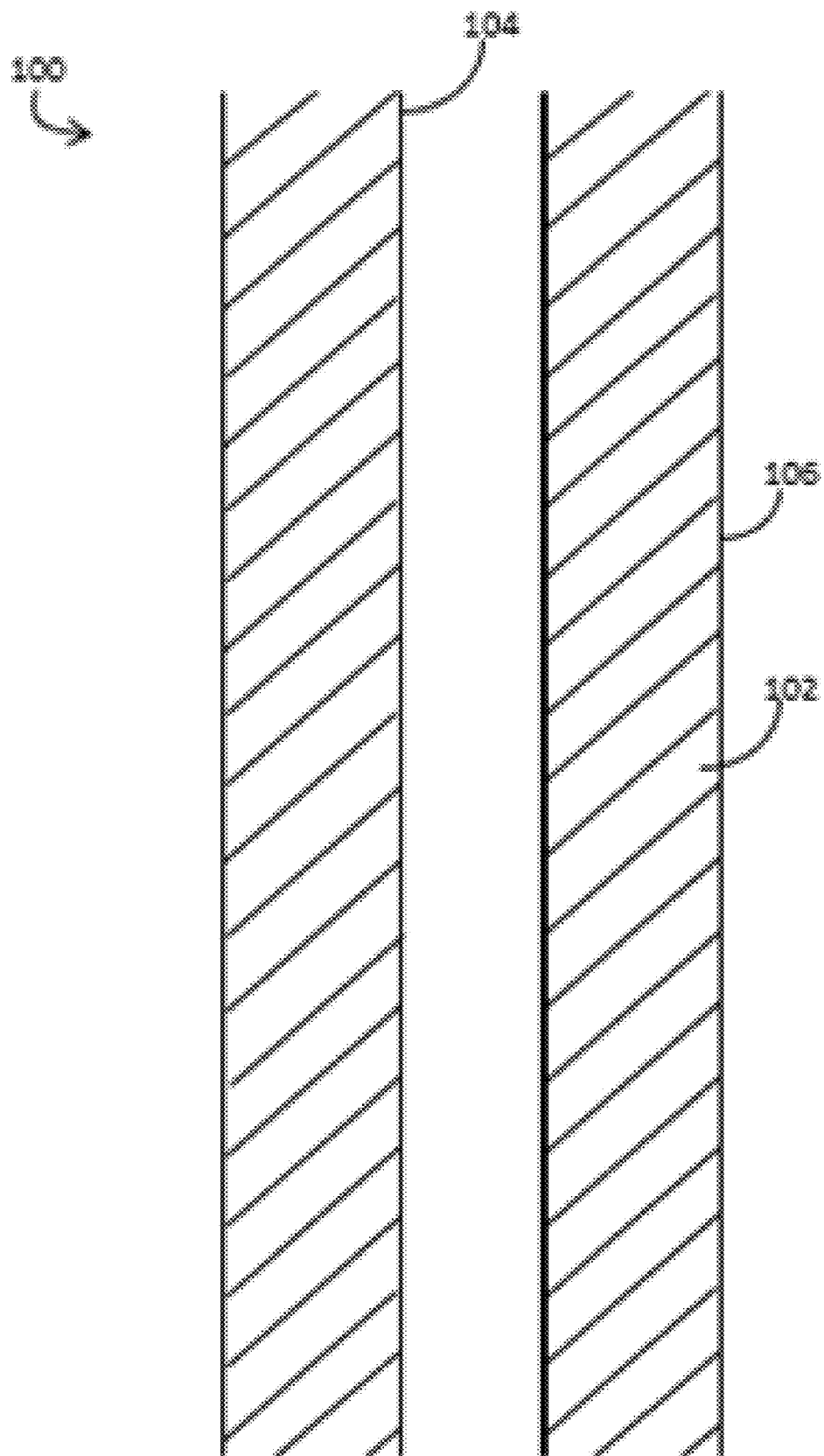
FIG. 1 depicts a system for forming an insulating gel in an annulus between an inner conduit and an outer conduit.

Insulating fluids described in this disclosure utilize network structures formed from an aqueous acidic nanosilica dispersion and an alkaline activator to yield an insulating gel having a low thermal conductivity. Forming a gel from the insulating fluid ("gelling") can be controlled by varying pH of the insulating fluid. A gel is considered to be present when the viscosified insulating fluid cannot be sheared. Varying the pH of the insulating fluid can be achieved by varying the concentration of the activator. In one example, gelling of the insulating fluid is accelerated by increasing the pH of the insulating fluid, with a greater pH typically resulting in faster gel formation. The delayed and controlled gelling of the insulating fluid allows the insulating fluid to be prepared and pumped prior to gelling. The insulating gel does not degrade at temperatures up to 300° F., and is environmentally friendly.

The acidic nanosilica dispersion is an aqueous dispersion that includes silica nanoparticles and an acid. A size of the silica nanoparticles is typically in a range between 5 nm and 100 nm. As described, "size" generally refers to a diameter or largest dimension of the silica nanoparticles. In one example, a size of the silica nanoparticles is in a range between 40 nm and 60 nm. The silica nanoparticles typically comprise 5 wt % to 50 wt % of the nanosilica dispersion. A viscosity of the nanosilica dispersion is typically in a range between 5 cP and 200 cP at room temperature.

Suitable acids include organic acids (such as a carboxylic acid) and mineral acids (such as hydrochloric acid). The acid typically includes at least one of acetic acid, lactic acid, and citric acid. A pH of the nanosilica dispersion is typically in a range between 2 and 4. A suitable nanosilica dispersion is IDISIL LPH35, available from Evonik Corporation. In some embodiments, the acidic nanosilica dispersion includes one or more additives, such as glycerin, calcium carbonate, mica graphite, and the like, selected to increase rigidity of the resulting gel. In some embodiments, acidic nanosilica dispersion includes 1 percent by volume (vol %) to 25 vol % of one or more additives.

The alkaline activator includes an alkanolamine. Combining the alkaline activator and the acidic nanosilica dispersion does not result in precipitation of silica nanoparticles ambient or elevated temperatures, for example in range of 100° F. to 300° F. Suitable alkanolamines include monoethanolamine, diethanolamine, and triethanolamine.

The acidic nanosilica dispersion and the alkaline activator are combined to yield an insulating fluid. The acidic nanosilica dispersion may consist of, or consist essentially of, the acidic nanosilica dispersion and the alkaline activator. In some embodiments, the acidic nanosilica dispersion and the alkaline activator are combined in a volume ratio in a range of 99:1 to 80:20 or 95:1 to 80:20. In one example, a molar ratio of nanosilica to monoethanolamine is 24:1. The insulating fluid has a pH greater than 7. In some embodiments, the insulating fluid has a pH equal to or less than 12. In one example, the acidic nanosilica dispersion includes acetic acid and the alkaline activator includes monoethanolamine in such a ratio that the acetic acid and the monoethanolamine react to yield 2-(hydroxy)ethylammonium acetate and N-(2-hydroxyethyl)acetamide, and the resulting insulating fluid has a pH greater than 7.

The insulating fluid is heated to yield an insulating gel. In one example, heating the insulating fluid to a temperature in a range between 100° F. and 300° F. yields an insulating gel in 2 h to 24 h. The rate of gelling of the insulating fluid can be controlled by selecting the pH of the insulating fluid. Selecting the pH of the insulating fluid can be achieved by adjusting the molar ratio of the acid in the nanosilica dispersion and the base in the alkaline activator. In one example, increasing the molar ratio of the base to the acid increases the pH of the insulating fluid (more alkaline) and accelerates formation of the insulating gel at a given temperature. In another example, decreasing the molar ratio of the base to the acid decreases the pH of the insulating fluid (less alkaline) and decelerates formation of the insulating gel at a given temperature. In the pH range of 7 to 12, a greater pH typically results in faster gel formation. The ability to delay or control the length of time for gel formation allows the insulating fluid to be premixed and pumped to a desired location, such as a pipeline or subterranean formation.

In some embodiments, an insulating gel is formed in an annulus between an inner conduit and an outer conduit to reduce heat transfer into or out of the inner conduit. The inner conduit may be a tubing, such as a production tubing. The outer conduit may be a tubing or an opening, such as a wellbore. Forming the insulating gel in the annulus thermally insulates the fluid from the surroundings outside the outer conduit. In some embodiments, the inner conduit is a production tubing, and the fluid flowing through the inner conduit is a hydrocarbon-containing fluid. The insulating gel may be used to insulate the hydrocarbon-containing fluid, thereby promoting optimum recovery of the hydrocarbon-containing fluid. For instance, if the surrounding environment is cold, the insulating gel may inhibit transfer of heat from the hydrocarbon-containing fluid to the environment, maintaining a temperature of the hydrocarbon-containing fluid sufficient to avoid solidification of heavier hydrocarbons and the accompanying reduction in flow rate. In some cases, the insulating gel may prevent collapse of a casing in a wellbore. Insulating gels formed as described in this disclosure may also be used in other applications and with other fluids for which the control of heat transfer is desirable. Insulating gels described in this disclosure do not degrade at temperatures up to 300° F., remaining in gel form to inhibit convection currents from transferring heat from the fluid in the inner conduit to the environment.

FIG. 1 depicts system 100 for providing an insulating fluid or components of an insulating fluid system to an annulus 102 between first conduit 104 and second conduit 106 in a subterranean formation. In some embodiments, the insulating fluid can be prepared and provided to annulus 102 as a single pill. In other embodiments, the acidic nanosilica dispersion is provided to annulus 102 first, and the alkaline activator is provided later.

Figure 2:
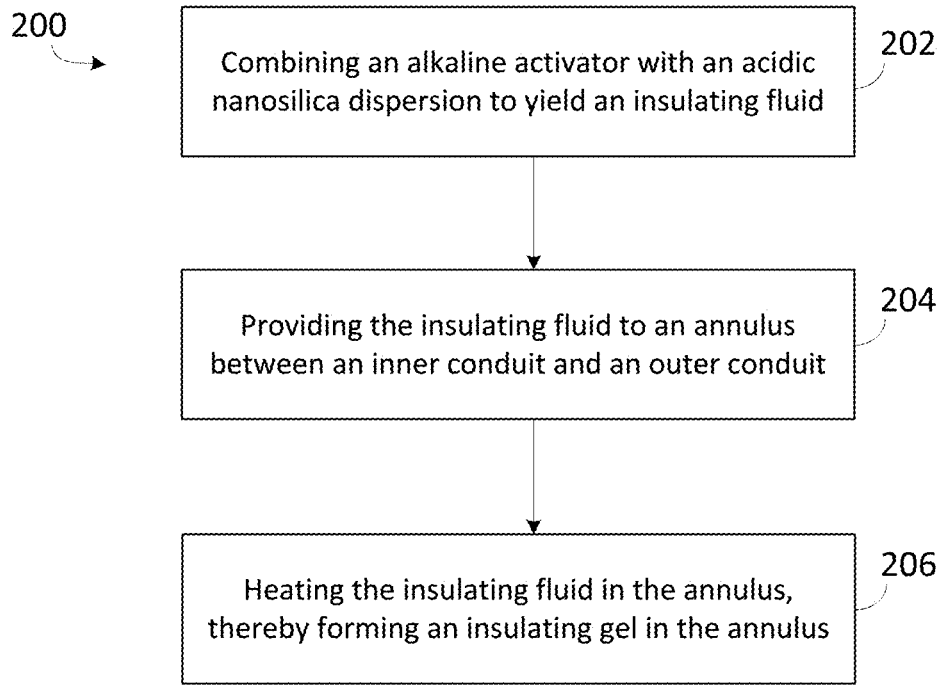
FIG. 2 is a flow chart for a first process for forming an insulating gel.

FIG. 2 is a flow chart showing operations in process 200 for forming an insulating gel in an annulus between an inner conduit and an outer conduit. In some embodiments, the inner conduit and the outer conduit are in a wellbore. In other embodiments, the inner conduit and outer conduit form part of a pipeline or other fluid flow system. In 202, an alkaline activator is combined with an acidic nanosilica dispersion to yield an insulating fluid. The insulating fluid typically has a pH greater than 7 and less than or equal to 12. In 204, the insulating fluid is provided to the annulus. In 206, the insulating fluid in the annulus is heated, thereby forming an insulating gel. The insulating fluid is typically heated to a temperature in a range between 100° F. and 300° F. The insulating gel typically forms in 2 h to 24 h. The inner conduit may be a production tubing, and a hydrocarbon-containing fluid may be flowing through the production tubing.

Figure 3:
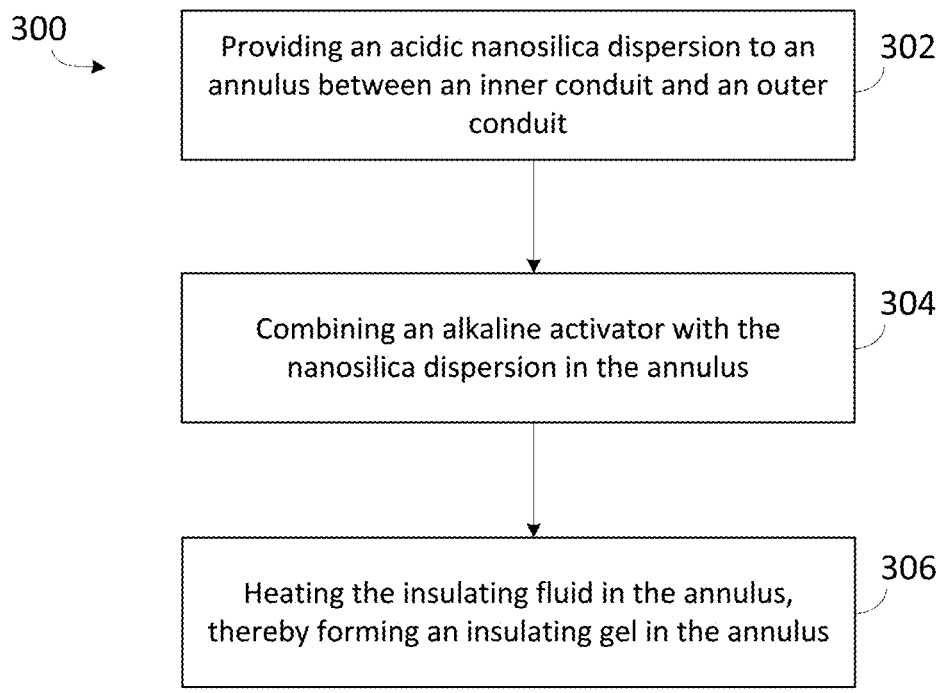
FIG. 3 is a flow chart for a second process for forming an insulating gel.

FIG. 3 is a flow chart showing operations in process 300 for forming an insulating gel in an annulus between an inner conduit and an outer conduit. In some embodiments, the inner conduit and the outer conduit are in a wellbore. In other embodiments, the inner conduit and outer conduit form part of a pipeline or other fluid flow system. In 302, an acidic nanosilica dispersion is provided to the annulus. In 304, an alkaline activator is combined with the nanosilica dispersion in the annulus to yield an insulating fluid. The insulating fluid typically has a pH greater than 7 and less than or equal to 12. In 306, the insulating fluid is heated in the annulus to form an insulating gel in the annulus. The insulating fluid is typically heated to a temperature in a range between 100° F. and 300° F. The insulating gel typically forms in 2 hours to 24 hours. The inner conduit may be a production tubing, and a hydrocarbon-containing fluid may be flowing through the production tubing.

Figure 4:
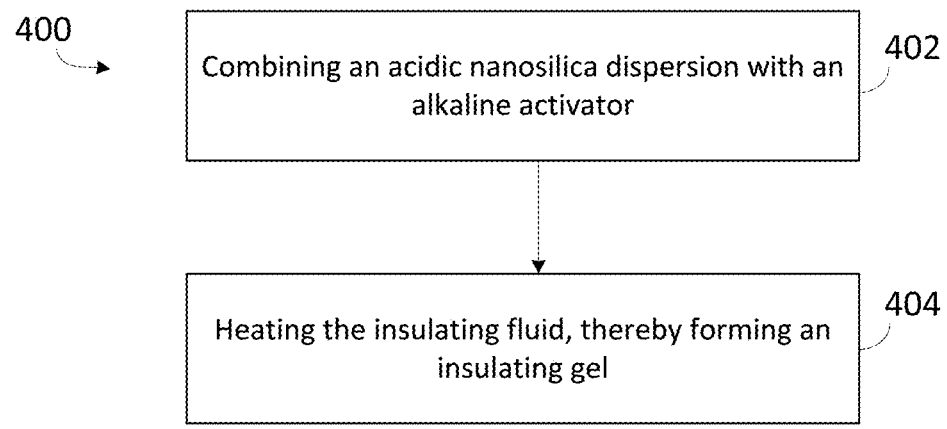
FIG. 4 is a flow chart for a third process for forming an insulating gel.

FIG. 4 is a flow chart showing operations in process 400 for forming an insulating gel. In some embodiments, the insulating gel is formed in a subterranean formation. In 402, an acidic nanosilica dispersion is combined with an alkaline activator to yield an insulating fluid. The insulating fluid typically has a pH greater than 7 and less than or equal to 12. In 404, the insulating fluid is heated to form an insulating gel. The insulating fluid is typically heated to a temperature in a range between 100° F. and 300° F. The insulting gel typically forms in 2 h to 24 h.

EXAMPLE 2 milliliters (mL) monoethanolamine (available from SABIC) was added over 5 minutes to 120 mL of an acidic nanosilica dispersion (IDISIL LPH35, from Evonik Corporation) with constant stirring to yield an insulating fluid. Properties of IDISIL LPH35 are listed in Table 1. The initial pH of acidic nanosilica dispersion was measured to be 3.6. The pH of the nanosilica dispersion after addition monoethanolamine was 9.28. This nanosilica dispersion was then placed in a high temperature, high pressure (HTHP) aging cell at 500 pounds per square inch (psi). The cell was placed in an oven and heated at 300° F. for 16 hours. After 16 hours of static aging at 300° F., the insulating fluid had formed a gelled solid, suitable for use as an insulating packer fluid. In Table 1, "g" represents "grams" and "° C." represents "degrees Celsius."

TABLE 1

Typical properties of IDISIL LPH35

| pH at 25° C. | Specific Gravity (g/mL) | Viscosity at 25° C. (cP) | Stabilizer | Visual Appearance |
|---|---|---|---|---|
| 2-4 | 1.2 | 30 | acetic acid | white/off white |

Figure 5:
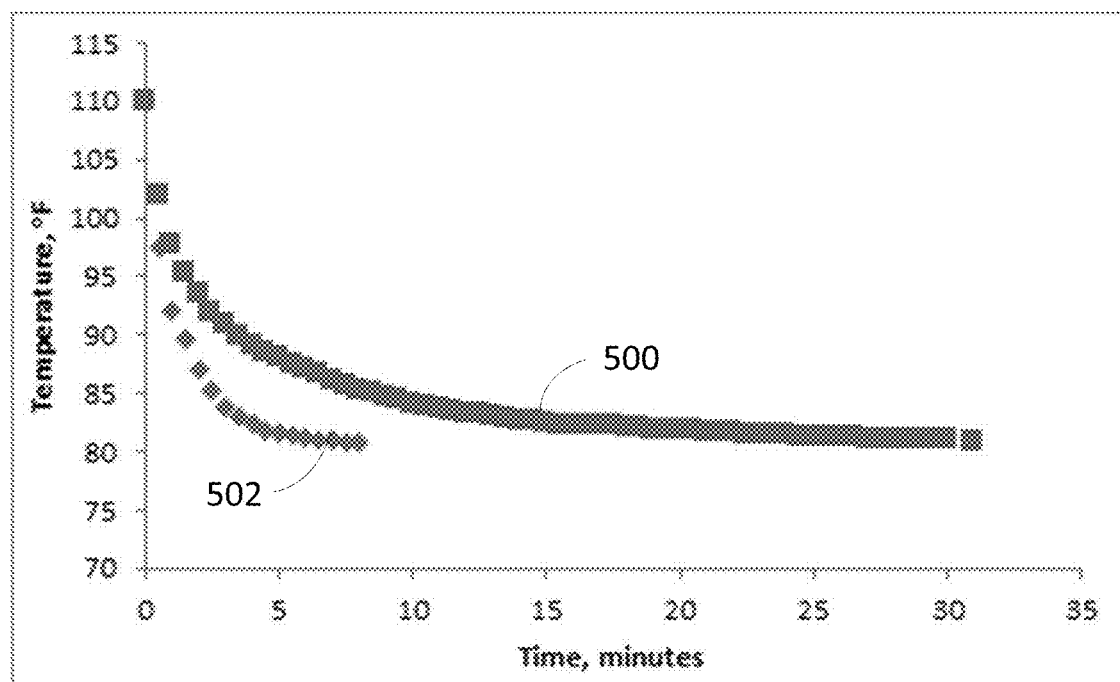
FIG. 5 is a graph showing thermal insulating properties of an insulating gel compared to thermal insulating properties of water.

Thermal insulation properties of the insulating gel were compared with thermal insulation properties of water. A graduated cylinder was placed in each of two 400 mL glass beakers. Water (75° F.) was added to one of the glass beakers and the prepared insulating gel (75° F.) was added to the other glass beaker to surround the graduated cylinders. 20 mL water heated to 110° F. was poured into each graduated cylinder. A temperature indicator was positioned in each of the graduated cylinders, and the insulating properties were compared by recording the time taken for the hot water placed in the measuring cylinders to reach 80.9° F. Plots 500 and 502 in FIG. 5 show temperature of the water in the graduated cylinder as function of time in minutes for beakers with insulating gel and water, respectively. As shown in FIG. 5, the time for the hot water surrounded by the insulating gel to cool from 110° F. to 80.9° F. was 32 minutes (min), while the time for the hot water surrounded by water to cool from 110° F. to 80.9° F. was 8 min. The time difference of 24 min shows that the heat loss in the case of the insulating packer fluid is much less than in the case of water.

Other aspects, advantages, and modifications of this disclosure are within the scope of the following claims.

What is claimed is:

1. An insulating fluid system for a wellbore in a subterranean formation, comprising:
    an acidic nanosilica dispersion comprising silica nanoparticles and a stabilizer, wherein pH of the acidic nanosilica dispersion is in a range of 2 to 4, and wherein viscosity of the acidic nanosilica dispersion at room temperature is in a range of 5 centipoise (cP) to 200 cP;
    an alkaline activator comprising an alkanolamine; and
    wherein the acidic nanosilica dispersion and the alkaline activator are separate; and
    wherein the alkaline activator then combines with the acidic nanosilica dispersion and activates the acidic nanosilica dispersion, to form an insulating fluid (i) having a pH in a range of 7 to 12, (ii) that insulates production tubing in the wellbore, and (iii) that forms an insulating gel in 2 to 24 hours at a temperature in a range of 100° F. and 300° F.

2. The insulating fluid system of claim 1, wherein the stabilizer comprises carboxylic acid comprising at least one of acetic acid, lactic acid, or citric acid, wherein the alkanolamine comprises at least one of monoethanolamine, diethanolamine, or triethanolamine, and wherein a volume ratio of the acidic nanosilica dispersion to the alkaline activator is at least in a range of 95:1 to 80:20.

3. The insulating fluid system of claim 1, wherein the silica nanoparticles comprise a particle size in a range of 5 nanometers (nm) to 100 nm, and wherein the silica nanoparticles are in a range of 5 weight percent (wt %) to 50 wt % of the acidic nanosilica dispersion.

4. The insulating fluid system of claim 1, wherein the acidic nanosilica dispersion comprises at least one of glycerin, calcium carbonate, or mica graphite, and wherein combining the alkaline activator and the acidic nanosilica dispersion does not result in precipitation of the silica nanoparticles.

* * * * *

UNITED STATES PATENT AND TRADEMARK OFFICE
CERTIFICATE OF CORRECTION

PATENT NO. : 11,313,204 B2
APPLICATION NO. : 16/799065
DATED : April 26, 2022
INVENTOR(S) : Wagle et al.

Page 1 of 1

It is certified that error appears in the above-identified patent and that said Letters Patent is hereby corrected as shown below:

In the Claims

Column 6, Line 42 (approx.), Claim 2, after "activator is" delete "at least".

Signed and Sealed this
Fifth Day of July, 2022

Katherine Kelly Vidal
*Director of the United States Patent and Trademark Office*